L. W. CHUBB.
METHOD AND APPARATUS FOR DETERMINING MELTING POINTS.
APPLICATION FILED MAY 6, 1915.

1,259,363.

Patented Mar. 12, 1918.

WITNESSES:
R. J. Fitzgerald
R. D. Brown

INVENTOR
Lewis W. Chubb.
BY
Wesley G. Carr
ATTORNEY

UNITED STATES PATENT OFFICE.

LEWIS W. CHUBB, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

METHOD AND APPARATUS FOR DETERMINING MELTING-POINTS.

1,259,363.     Specification of Letters Patent.     Patented Mar. 12, 1918.

Application filed May 6, 1915. Serial No. 26,322.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Methods and Apparatus for Determining Melting-Points, of which the following is a specification.

My invention relates to the determination of melting points of solid substances, and it has for one of its objects to provide a method of determining melting points with great facility and accuracy.

Another object of my invention is to provide an electrical system for practising my process.

Figure 1:
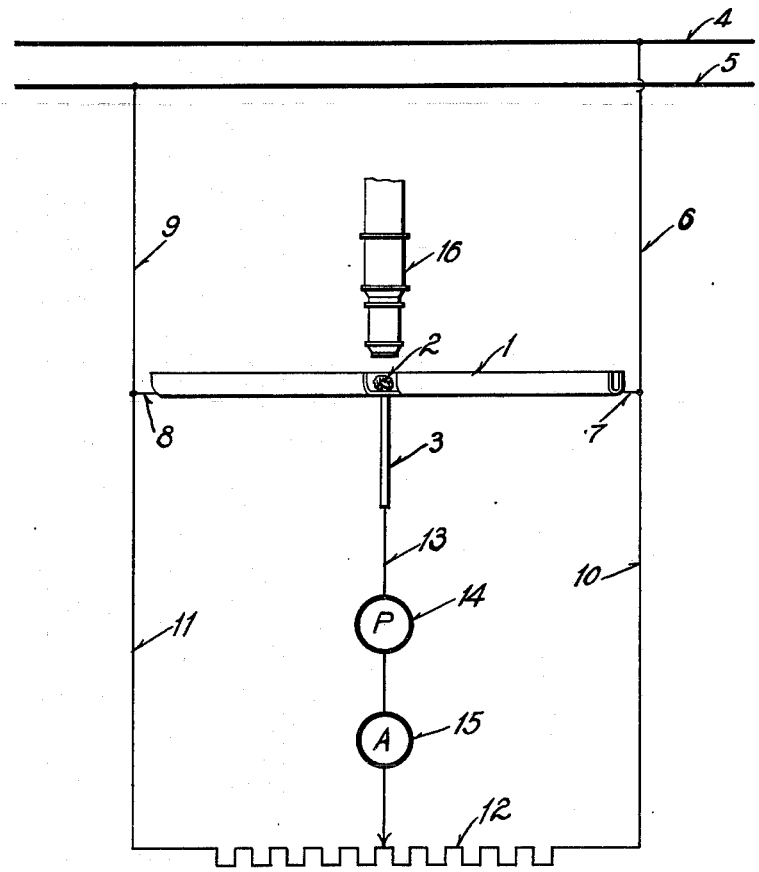
Figure 2:
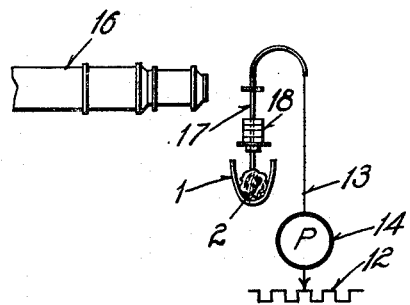

In the accompanying drawing, Figure 1 is a diagrammatic view showing a system of circuits and apparatus arranged in accordance with my invention, and Fig. 2 is an enlarged diagrammatic view of a portion of the apparatus shown in Fig. 1 illustrating a modified arrangement for practising my process.

In making determinations of melting points of small samples, according to one method that has been employed, a small particle of the material to be tested is placed upon a suitable support, usually a platinum ribbon, the temperature of which is gradually raised until the particle melts. While the ribbon and the particle are being heated, the particle is observed by means of a suitable microscope, and the instant when the material melts is ascertained by noting the change of form of the irregular particle, the rough outlines of which tend to soften and flow together. Another series of observations is simultaneously made by means of an optical pyrometer, the hot wire of which is supplied with current in progressively increasing increments in order to cause the wire to become incandescent to the same degree as the test particle. When the particle is seen to fuse, the measuring instrument attached to the optical pyrometer is read, and the melting temperature of the particle is computed from this reading.

The foregoing process is inconvenient in that the test particle must be observed at substantially the same time through two different instruments, and two observers are usually needed for this purpose. It also is restricted in its application to values above red heat. According to my present invention, I render unnecessary the use of optical pyrometers by making use of a thermo-electric couple which is brought in contact with the material to be tested and connected to a suitable electrical measuring instrument. I provide also convenient means for heating the test particle by electrical means.

Referring to Fig. 1 of the accompanying drawing, a ribbon 1 of a refractory conducting material, preferably platinum, is bent longitudinally into the trough shape shown in Fig. 2 for the purpose of receiving a test particle 2 and for insuring that the temperature of the particle 1 closely approximates the temperature of the supporting ribbon. A rod, ribbon or wire 3, preferably of platinum-rhodium alloy, is intimately connected to the platinum trough at a suitable point on its convex side to form, with the trough, a thermo-electric couple. The test particle should be placed at the junction between the trough 1 and the wire 3. I prefer to attach the members 1 and 3 together by means of the electro-percussive welding process set forth and claimed in my Patent No. 1,066,468, granted July 8, 1913.

For the purpose of heating the trough electrically, alternating current is supplied from line conductors 4 and 5 through supply conductors 6, 7, 8 and 9, and the conductors 7 and 8 are also connected, respectively, to other conductors 10 and 11 which are attached to the terminals of a non-inductive resistance element 12. The rod 3 is connected, by means of a conductor 13, to the neutral point, or point of no alternating current flow of the non-inductive resistance 12 and, under these circumstances, no alternating current flows through the conductor 13. In this conductor, is connected a direct-current measuring instrument 14, which is preferably a potentiometer but which may, if desired, be a millivoltmeter. An alternating-current measuring instrument 15 may also be connected in the conductor 13 in order to adjust the terminal of this conductor and bring it to the neutral point of the resistance element 12. A suitable microscope, part of which is indicated at 16, is provided for observing the test particle 2.

In the operation of the system just described, alternating current flows through the supporting trough 1 and progressively heats it, together with the test particle 2, which, as stated, should be disposed at the junction formed by the trough 1 and the rod 3. No alternating current flows in the conductor 13, but, as the temperature of the thermo-couple formed by the members 1 and 3 is progressively increased, a potential is generated by the couple tending to cause current to flow through the conductor 13 and the measuring instrument 14, the direct-current circuit being completed through the resistance element 12, the conductors 10, 7, 11 and 8 and the supporting trough 1. The particle 2 is observed through the microscope 16, and the direct-current instrument 14 is read when the particle is seen to change its form and begin to flow together. The temperature of the thermo-couple is computed from the reading of the potentiometer or millivoltmeter, according to well known methods.

In the modified arrangement shown in Fig. 2, the platinum trough 1 supports the test particle 2 as in Fig. 1, and is similarly heated by means of alternating current, but the platinum-rhodium wire or rod that constitutes the other member of the thermo-couple is arranged to rest upon the test particle with enough weight to penetrate it when it begins to fuse. As shown in Fig. 2, such a member is indicated at 17, small weights 18 being provided, if desired, to insure that the member 17 shall penetrate the test particle. The member 17 is connected to the conductor 13 which leads to the neutral point of the non-inductive resistance element 12, as in Fig. 1. The microscope 16, in this modified system, should be horizontally arranged to view a suitable mark on the member 17, and, when this mark is seen to move downwardly, the potential generated by the thermo-couple is computed from the reading of the instrument 14, as described above. An accurate measure of the softening point of the test particle is thus obtained without relying upon the visible change of form of the test particle.

The advantages of the system described above, in comparison with the method in which two simultaneous observations of the test particle are required, are evident, and it is also obvious that the system shown and described may be variously modified in accordance with operating conditions and the nature of the material to be tested. My invention is therefore to be understood as comprising all such modifications as fall within the scope of the appended claims.

I claim as my invention:

1. A device for determining melting points comprising a member of refractory conducting material adapted to support a sample to be tested; means for passing alternating electric current through the said member, another member intimately attached to the said supporting member and forming with it a thermo-electric couple, a non-inductive resistance element the terminals of which are connected, respectively, to the terminals of the said supporting member, and a direct-current electrical measuring instrument, one terminal of which is connected to the said second member of the thermo-electric couple and the other terminal of which is connected to the neutral point of the said non-inductive resistance element.

2. A device for determining melting points comprising a thermo-electric couple adapted to withstand elevated temperatures, a non-inductive resistance element having its terminals respectively connected to one member of the said couple, and a direct-current measuring instrument having its terminals respectively connected to the other member of the said couple and to the neutral point of the said non-inductive resistance.

In testimony whereof, I have hereunto subscribed my name this 30th day of April 1915.

LEWIS W. CHUBB.